United States Patent [19]

Asakura et al.

[11] Patent Number: 4,879,660

[45] Date of Patent: Nov. 7, 1989

[54] THREAD CUTTING MACHINE WITH SYNCHRONIZED FEED AND ROTATION MOTORS

[75] Inventors: Koichi Asakura, Toyoake; Makoto Demura, Toyokawa; Takenori Matsumoto, Kasugai, all of Japan

[73] Assignee: Brother Kogyo Kabushiki Kaisha, Nagoya, Japan

[21] Appl. No.: 174,508

[22] Filed: Mar. 28, 1988

[30] Foreign Application Priority Data

Mar. 31, 1987 [JP] Japan .................................. 62-80524
Apr. 2, 1987 [JP] Japan .................................. 62-82128
Aug. 28, 1987 [JP] Japan ................................ 62-215820
Aug. 28, 1987 [JP] Japan ................................ 62-215821

[51] Int. Cl.$^4$ ........................ B23G 1/16; G05B 19/18
[52] U.S. Cl. ........................... 364/474.15; 364/474.3; 408/9; 408/10; 318/39; 318/571
[58] Field of Search ....................... 364/474.15, 474.3; 408/9, 10; 318/39, 571

[56] References Cited

U.S. PATENT DOCUMENTS

| | | | |
|---|---|---|---|
| 3,784,798 | 1/1974 | Beadle et al. | 364/474.15 |
| 4,353,018 | 10/1982 | Kohzai et al. | 318/571 |
| 4,629,956 | 12/1986 | Nozawa et al. | 318/625 |
| 4,656,405 | 4/1987 | Kiya et al. | 318/571 |
| 4,692,071 | 9/1987 | Hirota | 408/9 |

Primary Examiner—Jerry Smith
Assistant Examiner—James J. Kulbaski
Attorney, Agent, or Firm—Finnegan, Henderson, Farabow, Garrett & Dunner

[57] ABSTRACT

A thread cutting machine is provided with a control system in which, according to one aspect, the rotation of the spindle is controlled in the synchronous manner following up the feed amount of the spindle head and the rotation instruction is computed in accordance with the feed deviation, In another aspect, the feed of the spindle head is controlled in the synchronous manner following up the rotation of the spindle and the feed instruction is computed in accordance with the rotation deviation. In a further aspect, the rotation instruction is operated in accordance with the feed speed and the feed acceleration. In still a further aspect, the feed instruction is computed in accordance with the rotation speed and the rotation acceleration. In the preferred embodiments disclosed herein, the synchronism between the rotation of the spindle and the feed of the spindle head can be remarkably improved with various control modes, thus achieving the high speed thread cutting working with high accuracy.

10 Claims, 8 Drawing Sheets

THREAD CUTTING MACHINE WITH SYNCHRONIZED FEED AND ROTATION MOTORS

BACKGROUND OF THE INVENTION

The present invention relates to a thread cutting machine including a typical tapping machine, and more particularly, to a type capable of performing a thread cutting operation precisely even at high speeds.

In a prior technique, a thread cutting working in a thread cutting machine to which a numerical control (NC) apparatus is applied has been performed by feeding and rotating a thread cutting tool (or tapping tool) such as a screw tap in accordance with the pitch of the threads to be worked on the basis of instructions from the NC apparatus. A feed motor for feeding the thread cutting tool and a spindle motor for rotating the same have been controlled by servo systems independently of each other, that is, both motors have been controlled without mutual relationship. The discrepancy between the feed amount and the rotation amount of the tool which may be caused in a reverse rotation of the spindle motor is compensated for by the mechanical expansion and contraction of a tapper interposed between the tapping tool and the spindle. This controlling method includes such problem as that the machining speed of the thread cutting is limited by the performance of the tapper to be used and the thread accuracy of the thread cutting may be lowered by the expansion and contraction of the tapper.

In order to overcome these problems or drawbacks, in the prior art Japanese Patent Laid-Open (KOKAI) Publication No. 56-33249 the actual rotation amount of the spindle is detected and the feed motor is driven in accordance with the detected rotation amount. In Japanese Patent Laid-Open (KOKAI) Publication No. 60-155319, the actual feed amount (i.e. rate of advance) of the spindle is detected and the rotation motor is driven in accordance with the detected feed amount. These prior art publications provide controlling apparatus wherein the feed motor and the rotation motor are driven in a synchronous mode, and the controlling apparatus can attain accurate synchronism between the feed motor and the rotation motor so that the thread cutting operation can be usually achieved without using any tapper means.

Recently, however, it is strongly required to shorten the machining time, and in some case, to carry out the thread cutting operation at a high machining speed substantially equal to the maximum machining speed of the tapping machine. In such a case, in the conventional machine, of the type described above, for driving the rotation motor in accordance with the feed amount of the feed motor, a follow-up time lag is observed because the instruction to the rotation motor is issued after the actual displacement of the feed shaft has been detected, thus providing a limitation to the improvement of the thread working accuracy. Particularly, in the thread cutting operation with relatively shallow thread depth or stepping working of the tool with relatively small stepping width, the actual working is often carried out under the transient condition before the feeding and rotating speeds reach the constant values, thus providing a significant problem causing machining error due to the follow-up time lag.

SUMMARY OF THE INVENTION

Accordingly, an object of this invention is to substantially eliminate defects or disadvantages encountered to the prior techniques of this field.

Another object of this invention is to provide an improved thread cutting machine capable of improving the mutual follow-up characteristics between a feed shaft and a spindle of the thread cutting machine to perform thread cutting with high accuracy even in high speed cutting at a speed near the operative limitation of a tapping machine.

These and other objects can be achieved according to the first aspect of this invention by providing a thread cutting machine of the type including a detector for detecting a rotating position of a spindle and a detector for detecting a feed position of a spindle head and carrying out a tapping working under synchronous driving operation of a spindle motor for rotating the spindle and a feed motor for driving the spindle head, the thread cutting machine comprising a unit for computing a feed deviation between a feed instruction and a feed position of the spindle head detected by the feed position detector, a unit for driving the feed motor in accordance with the feed deviation, a unit for computing a rotation instruction corresponding to the feed deviation on the basis of a thread pitch, a unit for operating a rotation correction value corresponding to the detected feed amount of the spindle head on the basis of the thread pitch, a unit for computing a rotation deviation between the rotation correction value and the rotating position of the spindle, a unit for correcting the rotation instruction, and a unit for driving the spindle motor in accordance with the corrected rotation instruction.

In the second aspect of this invention, there is provided a thread cutting machine of the type described above with respect to the first invention, comprising a unit for computing a rotation instruction and a rotating position of the spindle by the rotating position detector, a unit for driving the spindle motor in accordance with the rotation deviation, a unit for computing a feed instruction corresponding to the rotation deviation on the basis of a thread pitch, a unit for computing a feed correction value corresponding to the detected rotating position of the spindle on the basis of the thread pitch, a unit for computing a feed deviation between the feed correction value and the feed amount of the spindle head, a unit for correcting the feed instruction, and a unit for driving the feed motor in accordance with the correct feed instruction.

In the third aspect of this invention, there is provided a thread cutting machine of the type described above with respect to the first or second invention, comprising a unit for computing a feed deviation between a feed instruction and a feed position of the spindle head detected by the feed position detector, a unit for driving the feed motor in accordance with the feed deviation, a unit for computing a feed speed and an acceleration, a unit for computing a rotation instruction corresponding to the computed feed speed and acceleration on the basis of a thread pitch, a unit for computing a rotation correction value corresponding to the detected feed amount of the spindle head on the basis of the thread pitch, a unit for computing a rotation deviation between the rotation correction value and the rotating position of the spindle, a unit for correcting the rotation instruction, and a unit for driving the spindle motor in accordance with the corrected rotation instruction.

In the fourth aspect of this invention, there is provided a thread cutting machine of the type described above with respect to the first to third invention, comprising a unit for computing a rotation deviation between a rotation instruction and a rotating position of the spindle detected by the rotating position detector, a unit for driving the spindle motor in accordance with the rotation deviation, a unit for computing a rotation speed and an acceleration, a unit for computing a feed instruction corresponding to the computed feed speed and acceleration on the basis of a thread pitch, a unit for computing a feed correction value corresponding to the detected rotating position of the spindle on the basis of the thread pitch, a unit for computing a feed deviation between the feed correction value and the detected feed amount, a unit for correcting the feed instruction, and a unit for driving the feed motor in accordance with the corrected feed instruction.

According to the construction of the thread cutting machine of the first embodiment of the present invention, the feed amount is independently controlled in accordance with the feed instruction under the usual position feedback condition, and on the other hand, the rotation of the spindle is controlled in a synchronous manner so as to follow up the feed of the spindle head. The rotation instruction is computed by the feed deviation. Since the feed deviation is considered to be a value for instructing the feed speed to the feed drive unit, the rotation instruction is outputted in accordance with the feed instruction speed but not with the actual feed displacement. Accordingly, the rotation instruction is a value inclusive of a forecasted feed displacement, thus improving the transient follow-up characteristics of the rotation of the spindle to the feed of the spindle head. In addition, the thus computed rotation instruction is corrected in accordance with the actual feed amount by the arrangement of the rotation correction computing unit, the rotation deviation computing unit, and the correcting unit, so that the thread cutting efficiency can be remarkably improved without generating an error more than a usually existing error between the rotating position and the feed position.

According to the construction of the thread cutting machine of the second embodiment of the present invention, the rotation of the spindle is independently controlled in accordance with the rotation instruction under the usual position feedback condition, and on the other hand, the feed of the spindle head is controlled in a synchronous manner so as to follow up the rotation of the spindle. The feed instruction is computed in accordance with the rotation deviation. Since the rotation deviation is considered to be a value for instructing the rotation speed to the rotation drive unit, the feed instruction is outputted in accordance with the rotation instruction speed but not with the actual rotation amount of the spindle. Accordingly, the feed instruction is a value inclusive of a forecasted rotation amount of the spindle, thus improving the transient follow-up characteristics of the feed of the spindle head to the rotation of the spindle. In addition, the thus computed feed instruction is corrected in accordance with the actual rotation amount by the arrangement of the feed correction computing unit, the feed deviation computing unit and the correcting unit, so that the thread cutting efficiency can be remarkably improved without further generating an error more than the usually existing error between the feed position and the rotation position.

According to the construction of the thread cutting machine of the third embodiment of the present invention, the feed amount is independently controlled in accordance with the feed instruction under the usual position feedback condition, and on the other hand, the rotation of the spindle is controlled in a synchronous manner so as to follow up the feed. The rotation instruction is computed in accordance with the feed speed and the feed acceleration. Accordingly, the rotation instruction is considered to be a value inclusive of a forecasted feed displacement but not the actual feed amount, so that the transient follow-up characteristics of the rotation of the spindle to the feed of the spindle head can be remarkably improved. Moreover, the thus computed rotation instruction is corrected in accordance with the actual feed amount by the arrangement of the rotation correction computing unit, the rotation deviation computing unit and the correcting unit, so that the thread cutting efficiency can be highly improved without generating an error more than the usually existing error between the rotating position and the feed position.

According to the construction of the thread cutting machine of the fourth embodiment of the present invention, the rotation of the spindle is independently controlled in accordance with the rotation instruction under the usual position feedback condition, and on the other hand, the feed of the spindle head is controlled in a synchronous manner so as to follow up the rotation of the spindle. The feed instruction is computed by the rotation speed and the rotation acceleration of the spindle. Accordingly, the feed instruction is considered to be a value inclusive of a forecasted rotation amount of the spindle but not the actual rotation amount of the spindle, thus improving the transient follow-up characteristics of the feed of the spindle head to the rotation of the spindle. Moreover, the feed instruction is corrected in accordance with the actual rotating position by the arrangement of the feed correction computing unit, the feed deviation computing unit and the correcting unit, so that the thread cutting efficiency can be remarkably improved without generating an error more than the usually existing error between the rotating position and the feed position.

The preferred embodiments of the thread cutting machine according to this invention will be described in detail hereinafter with reference to the accompanying drawings.

BRIEF DESCRIPTION OF THE DRAWINGS

The accompanying drawings represent preferred embodiments of a thread cutting machine according to this invention, in which.

DESCRIPTION OF THE PREFERRED EMBODIMENT

Figure 1:
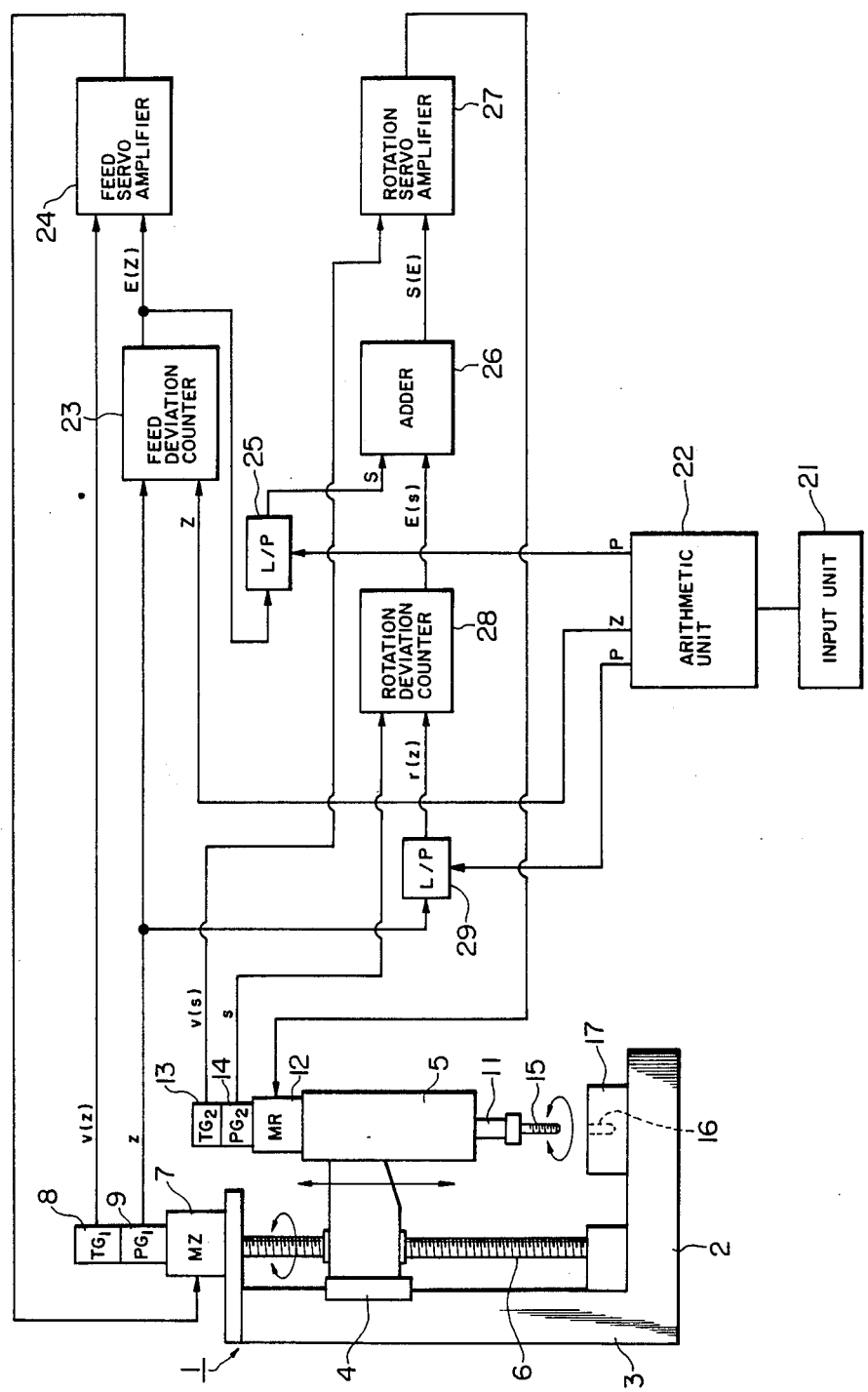
FIG. 1 is a block diagram showing the first embodiment of this invention.

Referring to the drawings of the schematic diagrams representing preferred embodiments according to this invention, a machine body 1 of a thread cutting machine constitutes a vertical tapping machine comprising a workpiece supporting stand 2, a column 3 vertically extending from one end of the workpiece supporting stand 2, a slider 4 threadingly engaged with a ball threaded shaft 6, and a spindle head 5 supported by the slider 4. The ball threaded shaft 6 is rotated by a feed motor 7 generally comprising an AC servo motor to vertically move the slider 4. A rotating speed detecting tachometer generator ($TG_1$) 8 and a rotating position detecting pulse generator ($PG_1$) 9 are operatively connected to the feed motor 7. The pulse generator ($PG_1$) 9 detects the feed position of the spindle head 5.

A spindle 11 held by the spindle head 5 to be rotatable is driven by a spindle motor 12 which generally comprises an AC servo motor. To the electric motor 12 are operatively connected a rotating speed detecting tachometer generator ($TG_2$) 13 and a rotating position detecting pulse generator ($PG_2$) 14. The pulse generator ($PG_2$) 14 serves as detecting means to detect the rotating position of the spindle 11.

A thread cutting tool 15 is directly mounted to the lower end portion of the spindle 11 without interposing any tapper means to perform a thread cutting working to a hole 16 formed at a workpiece 17 mounted on the workpiece supporting stand 2.

Hereinafter, the respective embodiments will be described with reference to the corresponding drawings, and first, referring to FIG. 1 representing the first embodiment of this invention, a control circuit for a feed system (hereinafter referred to as Z-axis system) for moving vertically the spindle head 5 will be described.

The data supplied from an input unit 21 is subjected to arithmetic processing in an arithmetic unit 22 to provide a feed instruction pulse Z. The feed instruction pulse Z is supplied to a feed deviation counter 23 in the form of a pulse train in response to the feed speed. A pulse in response to the rotation angle of the feed motor 7 is inputted into the deviation counter 23 from the pulse generator ($PG_1$) 9 as a position feedback pulse. The deviation counter 23 computes the deviation $E(Z)=Z-z$, wherein Z designates the feed instruction pulse and z designates the feed position of the spindle head 5 detected by the pulse generator ($PG_1$), the thus computed deviation $E(Z)$ is applied to a feed servo amplifier 24 as an instruction representing the speed. To the feed servo amplifier 24 is inputted a signal $v(z)$ from the tachometer generator ($TG_1$) 8 as a speed feedback signal corresponding to the actual speed, thus constituting a speed loop circuit to drive the feed motor 7. A control circuit for the feed system described above has substantially the same construction as that utilized for a usual feed control system.

A control circuit for a rotation system (S-axis system) for controlling the rotation of the spindle 11 will operate as follows.

In the rotation system, the rotation instruction S is provided upon processing and controlling in accordance with the feed deviation $E(Z)$ fed from the feed deviation counter 23 but not with the data from the input unit 21.

The feed deviation $E(Z)$ from the feed deviation counter 23 is inputted to a rotation instruction arithmetic unit 25 in which the feed deviation $E(Z)$ is multiplied by L/P times and the rotation instruction ($S=E(Z)\cdot L/P$) corresponding to the feed deviation $E(Z)$ is computed in accordance with the thread pitch P in the thread cutting working and the lead L of the ball threaded shaft 6 which are preliminarily inputted to the rotation instruction arithmetic unit 25 from the input unit 21 through the arithmetic unit 22. The thus obtained rotation instruction S is applied to a rotation servo amplifier 27 through an adder 26. It is assumed that the instruction S corresponds to the deviation $E(Z)$, i.e. the speed instruction supplied to the feed servo amplifier 24, so that the instruction S will be regarded as a forecasted movement of the spindle head 5.

An adder 26 serves to correct the rotation instruction S in the following manner. The pulse fed from the pulse generator ($PG_2$) 14 which detects the rotating position s of the spindle 11 is inputted to a rotation deviation counter 28, and the pulse fed from the pulse generator ($PG_1$) 9 which detects the feed amount (i.e. rate of advance) z is inputted to a rotation correction arithmetic unit 29. In the arithmetic unit 29, the feed amount z is multiplied by L/P times in accordance with the aforementioned thread pitch P and the thread lead L and a rotation correction value $r(z)$ corresponding to the feed amount z is computed and then outputted to the rotation deviation counter 28, in which the rotation deviation $E(s)$ between the rotating position s of the spindle 11 and the rotation correction value $r(z)$ is computed and the resultant value is applied to the adder 26. The added 26 corrects the rotation instruction S from the rotation instruction arithmetic unit 25 in accordance with the rotation deviation $E(s)$ and applies the thus corrected rotation instruction, $S(E)=S+E(s)$, to the rotation servo amplifier 27.

A speed-dependent signal $v(s)$ generated by the tachometer generator ($TG_2$) 13 is inputted to the rotation servo amplifier 27 as a speed feedback signal, thereby constituting the speed loop circuit. The motor 12 is thus driven in accordance with the corrected rotation instruction $S(E)$.

The control circuit means described hereinabove implements digital arithmetic operations. The arithmetic unit 22, the deviation counters 23 and 28, the rotation instruction arithmetic unit 25, the rotation correction arithmetic unit 29, and the adder 26 are all realized with microcomputers which carry out the internal operation processings.

The feed motor 7 is driven in response to the data indicative of the thread pitch, the feed stroke (i.e. tap depth), and the feed speed inputted from the input unit 21, and the motor 12 is then driven in the manner following to and synchronous with the rotation of the feed motor 7, thus performing thread cutting.

In thread cutting based on the first embodiment of this invention described hereinbefore, since the motor 12 is synchronously driven on the basis of the feed deviation $E(Z)$, the transient follow-up time lag can be remarkably reduced in comparison with the conventional system in which the motor is synchronously driven on the basis of the feed amount z. For example, an experiment carried out in condition that thread cutting (diameter: 6 mm (M6), pitch: 1.0 (P1.0) and tap depth: 12 mm) was performed at high speed rotation of the spindle of 3000 r.p.m. showed the fact that the feed error in the thread feeding direction (Z-axis) on the basis of the rotating position of the thread could be reduced to about 25% with respect to the conventional system.

Figure 2:
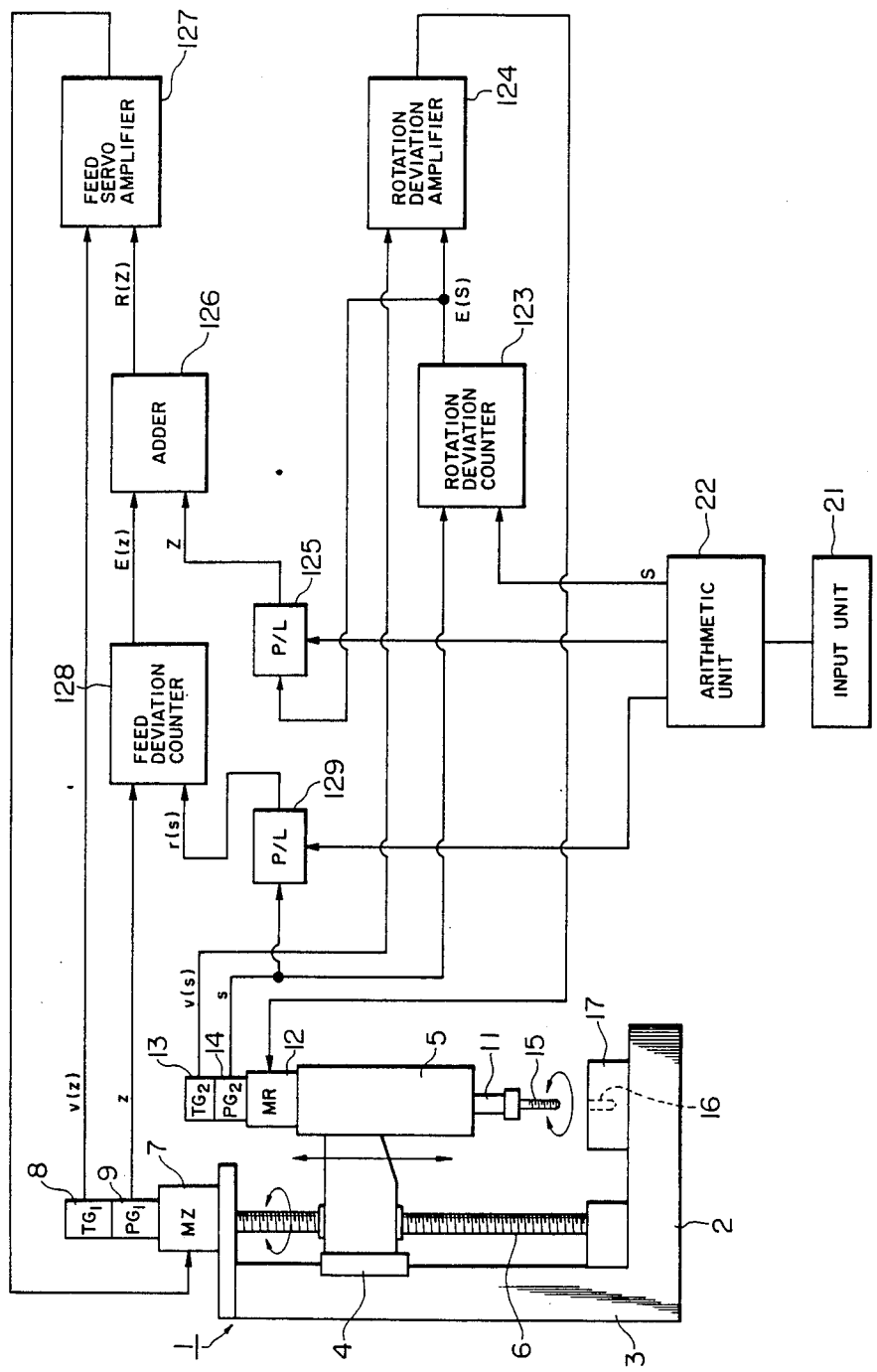
FIG. 2 is a block diagram showing the second embodiment of this invention.

The second embodiment according to this invention will be described with reference to FIG. 2.

A control circuit means of a rotation system (S-axis system) for carrying out the rotation control of the spindle 11 will be first explained.

The date supplied from an input unit 21 is subjected to arithmetic processing in an airthmetic unit 22 to provide the rotation instruction S and the thus computed instruction S is applied to a rotation deviation counter 123 in the form of a pulse train corresponding to the rotation speed. A pulse corresponding to the rotation angle of the motor 12 is inputted from the pulse generator ($PG_2$) 14 to the rotation deviation counter 123 as a position feedback pulse. The rotation deviation counter 123 computes the deviation $E(S)=S-s$ between the rotation instruction S and the rotating position s of the spindle 11 detected by the pulse generator ($PG_2$) 14, and the thus computed deviation $E(S)$ is then applied as a speed instruction to a rotation servo amplifier 124. A signal v(s) corresponding to the actual speed is inputted to the rotation servo amplifier 124 as a speed feedback signal from the tachometer generator ($TG_2$) 13, thus constituting a speed loop circuit thereby driving the motor 12. The control circuit for the described rotation system (S-axis system) has substantially the same construction as that utilized for an ordinal rotation control system.

A control circuit for a feed system (Z-axis system) for moving vertically the spindle head 5 will be explained hereinbelow.

In the feed system, the feed instruction Z is provided upon processing and controlling in accordance with the rotation deviation $E(S)$ fed from the rotation deviation counter 123 but not with the data from the input unit 21.

The rotation deviation $E(S)$ from the rotation deviation counter 123 is inputted to a feed instruction arithmetic unit 125 in which the rotation deviation $E(S)$ is multiplied by P/L times and the feed instruction $Z=E(S) \cdot P/1$ corresponding to the rotation deviation $E(S)$ is computed in accordance with the thread pitch P and the lead L of the ball threaded shaft 6 for the thread cutting working preliminarily inputted to the feed instruction arithmetic unit 125 from the input unit 21 through the arithmetic unit 22. The thus obtained feed instruction Z is regarded as a value corresponding to the rotation deviation $E(S)$, i.e. speed instruction supplied to the rotation servo amplifier 124, so that the feed instruction Z will be regarded as a forecasted rotation of the spindle 11.

An adder 126 serves to correct the feed instruction Z in the following manner. The pulse fed from the pulse generator ($PG_1$) 9 which detects the feed position z of the spindle head 5 is inputted to a feed deviation counter 128, and the pulse from the pulse generator ($PG_2$) 14 which detects the rotation amounts is inputted into a feed correction arithmetic unit 129. In the arithmetic unit 129, the rotation amount s is multiplied by P/L times in accordance with the aforementioned thread pitch P and the thread lead L and the feed correction value r(s) corresponding to the rotation amount s is computed and then outputted to the feed deviation counter 128. The feed deviation counter 128 serves to compute the feed deviation E(z) between the feed correction value r(s) and the feed position z of the spindle head 5 and the thus computed feed deviation E(z) is then applied to the adder 126. The adder 126 corrects the feed instruction Z from the feed instruction arithmetic unit 125 in accordance with the feed deviation E(Z) and applies the corrected feed instruction, $R(z)=Z+E(Z)$, to the feed servo amplifier 127.

To the feed servo amplifier 127 is inputted, as a speed feedback signal, a signal v(z) in response to the speed from the tachometer generator($TG_1$) 8, thus constituting a speed loop circuit thereby driving the feed motor 7 in response to the corrected feed instructions R(Z).

The control circuit means described hereinabove implements digital arithmetic operations. The arithmetic unit 22, the deviation counters 123 and 128, the feed instruction arithmetic unit 125, the feed correction arithmetic unit 129, and the adder 126 are all realized with microcomputers which carry out the internal operation processings.

The rotation motor 12 is driven in response to the data indicative of the thread pitch, the feed stroke (i.e. tap depth), and the rotation speed inputted from the input unit 21, and the feed motor 7 is then driven in the manner following to and synchronous with the motor 12, thus performing the thread cutting working.

According to the thread cutting working based on the second embodiment of this invention described above, since the feed motor 7 is synchronously driven on the basis of the rotation deviation $E(S)$, the transient follow-up time lag can be remarkably reduced in comparison with the conventional system in which the feed motor is synchronously driven on the basis of the rotation amount s. For example, an experiment caried out in condition that thread cutting (diameter: 6 mm(M6), pitch: 1.0(P1.0) and tap depth: 12 mm) was performed at high speed rotation of 3000 r.p.m. showed the fact that the feed error in the thread feeding direction (Z-axis) on the basis of the rotating position of the thread could be reduced to about 20% with respect to the conventional system.

The third embodiment according to this invention will be described with reference to FIG. 3.

A control circuit means of a feed system (Z-axis system) for moving vertically the spindle head 5 will be first explained.

The data supplied from an input unit 21 is subjected to arithmetic processing in an arithmetic unit 22 to provide the feed instruction Z and the thus computed instructions Z are applied to a feed deviation counter 223 in the form of a pulse train corresponding to the feed speed. A pulse corresponding to the rotation angle of the feed motor 7 is inputted to the feed deviation counter 223 from the pulse generator ($PG_1$) 9 as a position feedback pulse. The rotation deviation counter 223 computes the deviation $E(Z)=Z-z$ between the feed instruction Z and the feed position of the spindle head 5 detected by the pulse generator ($PG_1$) 9, and the thus computed feed deviation $E(Z)$ is applied to a feed servo amplifier 224, as a speed instruction. A signal v(s) corresponding to the actual speed is inputted to the feed servo amplifier 224 as a speed feedback signal from tachometer generator ($TG_1$) 8, thus constituting a speed loop circuit thereby driving the feed motor 7. The control circuit for the described feed system (Z-axis system) is substantially the same as a circuit used for an ordinary feed control.

A control circuit for a rotation system (S-axis system) for performing the rotation control of the spindle 11 will be explained in accordance with the third embodiment of this invention. In this rotation system, the rotation instruction S is provided upon processing and controlling in accordance with the feed instruction Z but not with the data from the input unit 21.

The feed instruction Z from the arithmetic unit 22 is inputted into an acceleration arithmetic unit 225, in which the feed acceleration, i.e. $A(Z)=d\Delta Z/dt$, is computed on the basis of the feed instruction amount $\Delta Z$ per a unit time and the thus computed acceleration $A(Z)$ is applied to an adder 226 to which the feed feedback pulse is inputted from the pulse generator (PG$_1$) 9. The adder 226 serves to add the actual feed amount $\Delta z$ per a unit time to the acceleration $A(Z)$ of the feed instruction Z and the resultant value is applied to a rotation instruction arithmetic unit 227. Since the feed amount $\Delta z$ per a unit time is a value corresponding to the actual feed speed $v(z)$, the output from the adder 226 is expressed as $(\Delta z+d\Delta Z/dt)$ based on the addition of the feed speed and the acceleration.

The rotation instruction arithmetic unit 227 computes the rotation instruction, $S_1 = L/P\cdot(\Delta z+d\Delta Z/dt)$, by multiplying the output from the adder 226 by L/P times, in accordance with the thread pitch P and the thread lead L of the threaded shaft 6 for the thread cutting preliminarily inputted from the input unit 21 through the arithmetic unit 22. The acceleration arithmetic unit 225, the adder 226 and the rotation instruction arithmetic unit 227 constitute a rotation instruction arithmetic means.

Since the rotation instruction $S_1$ outputted from the rotation instruction arithmetic unit 227 corresponds to a value obtained by the addition of the feed speed to the acceleration, the rotation instruction $S_1$ becomes instruction including the forecasted movement or displacement of the spindle head 5. The rotation instruction $S_1$ is applied to a servo amplifier 229 through an adder 228, in which the correction of the rotation instruction $S_1$ is performed in the following manner. A pulse from the pulse generator (PG$_2$) 14 detecting the rotating position of the spindle 11 is inputted to a rotation deviation counter 230 and a pulse from the pulse generator (PG$_1$) 9 detecting the feed amount z is inputted into a rotation correction arithmetic unit 231, in which the feed amount z is multiplied by L/P times on the basis of the aforementioned thread pitch P and the thread lead L and the rotation correction value, $r(z)=L/P\cdot z$, corresponding to the feed amount z is computed and applied to the rotation deviation counter 230. The rotation deviation counter 230 serves to compute the rotation deviation E(s) between the rotation correction value r(z) and the rotating position s of the spindle 11 and the thus computed rotation deviation E(s) is then applied to the adder 228. The adder 228 serves to correct the rotation instruction $S_1$ from the rotation instruction arithmetic unit 227 in accordance with the rotation deviation E(s) and the corrected rotation instruction, $S_1(E)=S_1+E(s)$, is outputted therefrom to the rotation sevo amplifier 229.

To the rotation servo amplifier 229, as a speed feedback signal, in response to the speed from the tachometer generator (TG$_2$) 13, thus constituting a speed loop circuit, thereby driving the motor 12 in accordance with the corrected rotation instruction $S_1(E)$.

The control circuit means in the described third embodiment implements the digital arithmetic operations, and the arithmetic unit 22, the deviation counters 223 and 230, the acceleration arithmetic unit 225, the adder 226, the rotation instruction arithmetic unit 227, the rotation correction arithmetic unit 231, and the adder 228 are all realized with microcomputers which carry out the internal operation processings.

The feed motor 7 is driven by the data indicative of the thread pitch, the feed stroke (i.e. tap depth), and the feed speed inputted from the input unit 21, and the rotation motor 12 is then driven in the manner following to and synchronous with the feed motor 7, thus performing the thread cutting working.

With the third embodiment described above, the feed acceleration is obtained on the basis of the feed instruction Z and the rotation instruction is computed by the obtained acceleration $A(Z)$, but in a modification, the feed acceleration may be obtained from the other value.

Figure 4:
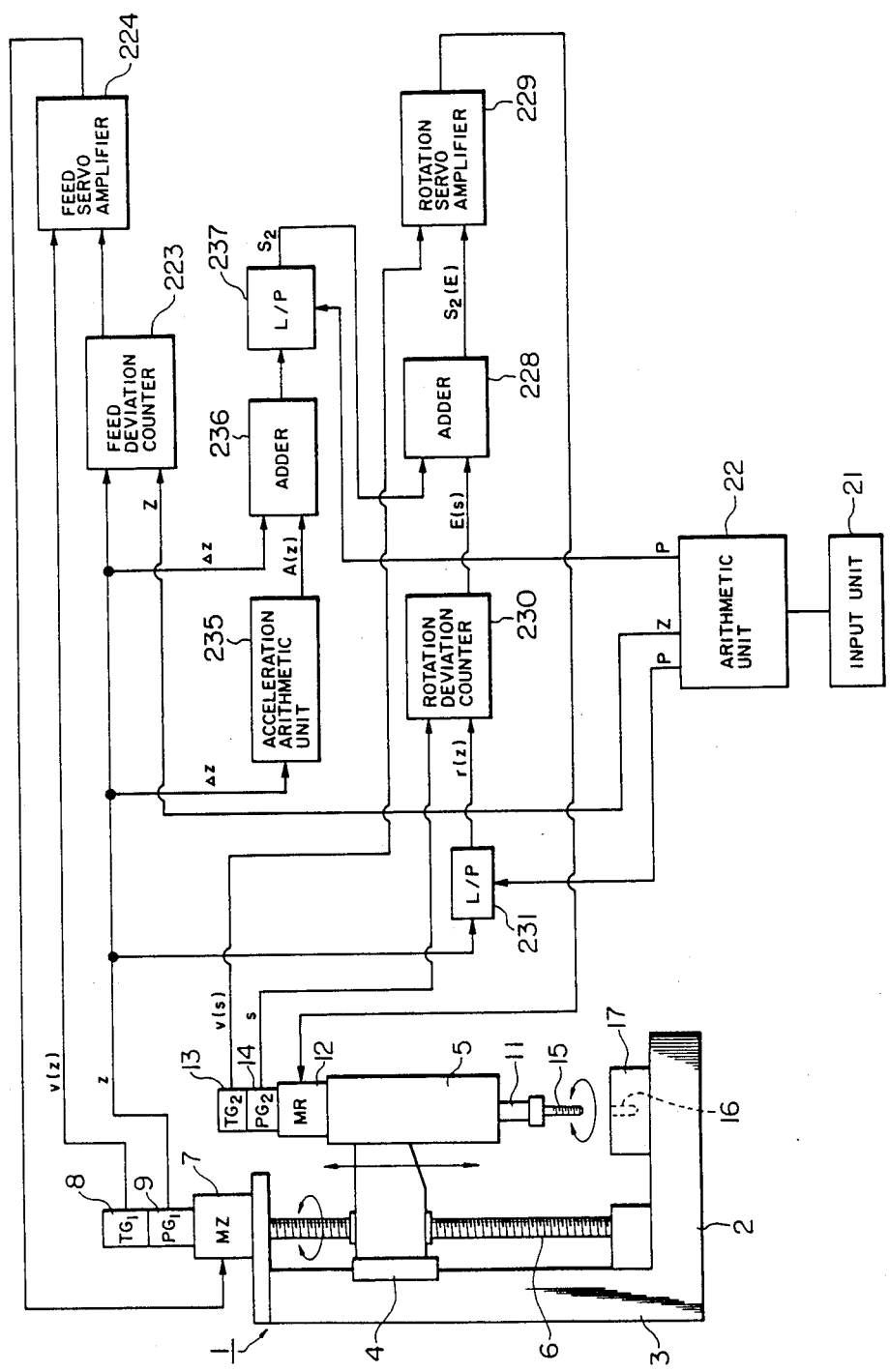
FIG. 4 is a block diagram showing the fourth embodiment of this invention.

The fourth embodiment according to this invention is represented by the block diagram shown in FIG. 4, in which the feed acceleration is not computed in accordance with the feed instruction Z but is computed in accordance with the actual feed amounts of the spindle head 5.

Figure 3:
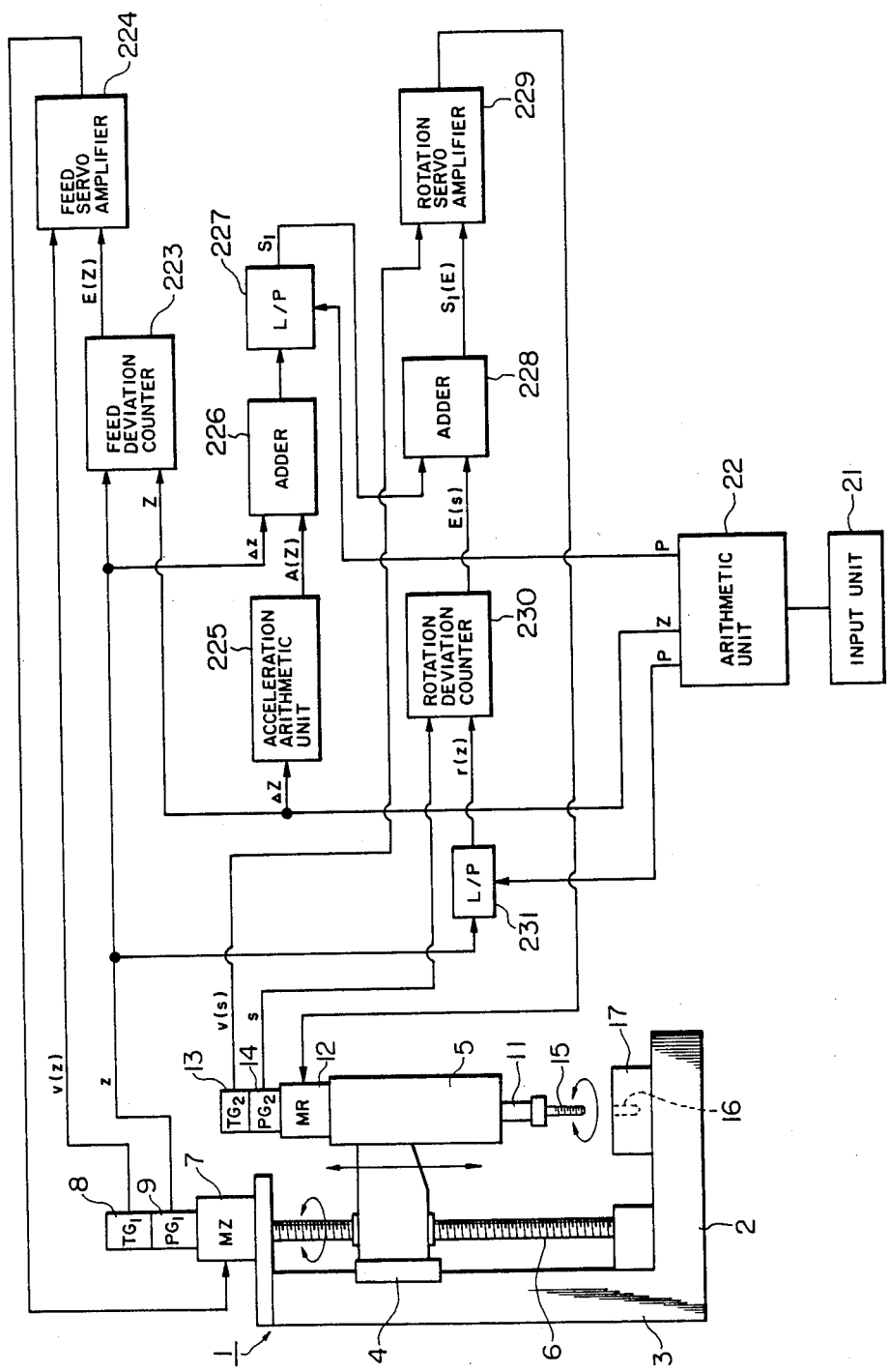
FIG. 3 is a block diagram showing the third embodiment of this invention.

Referring to FIG. 4, like reference numerals refer to elements or units corresponding to those shown in FIG. 3 and the explanation thereof is omitted herein. The system shown in FIG. 4, unlike the system in FIG. 3, specifically includes the connecting arrangement between the acceleration arithmetic unit 235, the adder 236 and the rotation instruction arithmetic unit 237 all of which constitute a rotation instruction arithmetic means.

The feed feedback pulse from the pulse generator (PG$_1$) 9 is inputted to the acceleration arithmetic unit 235 and the adder 236. The acceleration arithmetic unit 235 serves to compute the feed acceleration, $A(z)=d\Delta Z/dt$, from the actual feed amount $\Delta z$ per unit time and the thus computed acceleration $A(z)$ is applied therefrom to the adder 236. The adder 236 serves to add the inputted acceleration $A(z)$ to the feed amount $\Delta z$ per unit time from the pulse generator (PG$_1$) 9 and the resultant value is outputted therefrom to the rotation instruction arithmetic unit 237. The output from the adder 236 is the sum of addition of the feed speed and the acceleration, the sum being represented by $(\Delta z+d\Delta z/dt)$. the rotation instruction arithmetic unit 237 serves to multiply the output from the adder 326 by L/P times in accordance with the thread pitch P and the thread lead L for the thread cutting working which are preliminarily obtained from the input unit 21 and then to compute the rotation instruction, $S_2=L/P\cdot(\Delta z+d\Delta z/dt)$, which is then applied to the adder 228.

The rotation instruction $S_2$ is corrected by the added 228 to obtain the correct rotation instruction, $S_2(E)=S_2+E(s)$, so that the rotation servo amplifier 229 is driven, whereby the motor 12 is controlled as described with respect to the aforementioned third embodiment.

Figure 5:
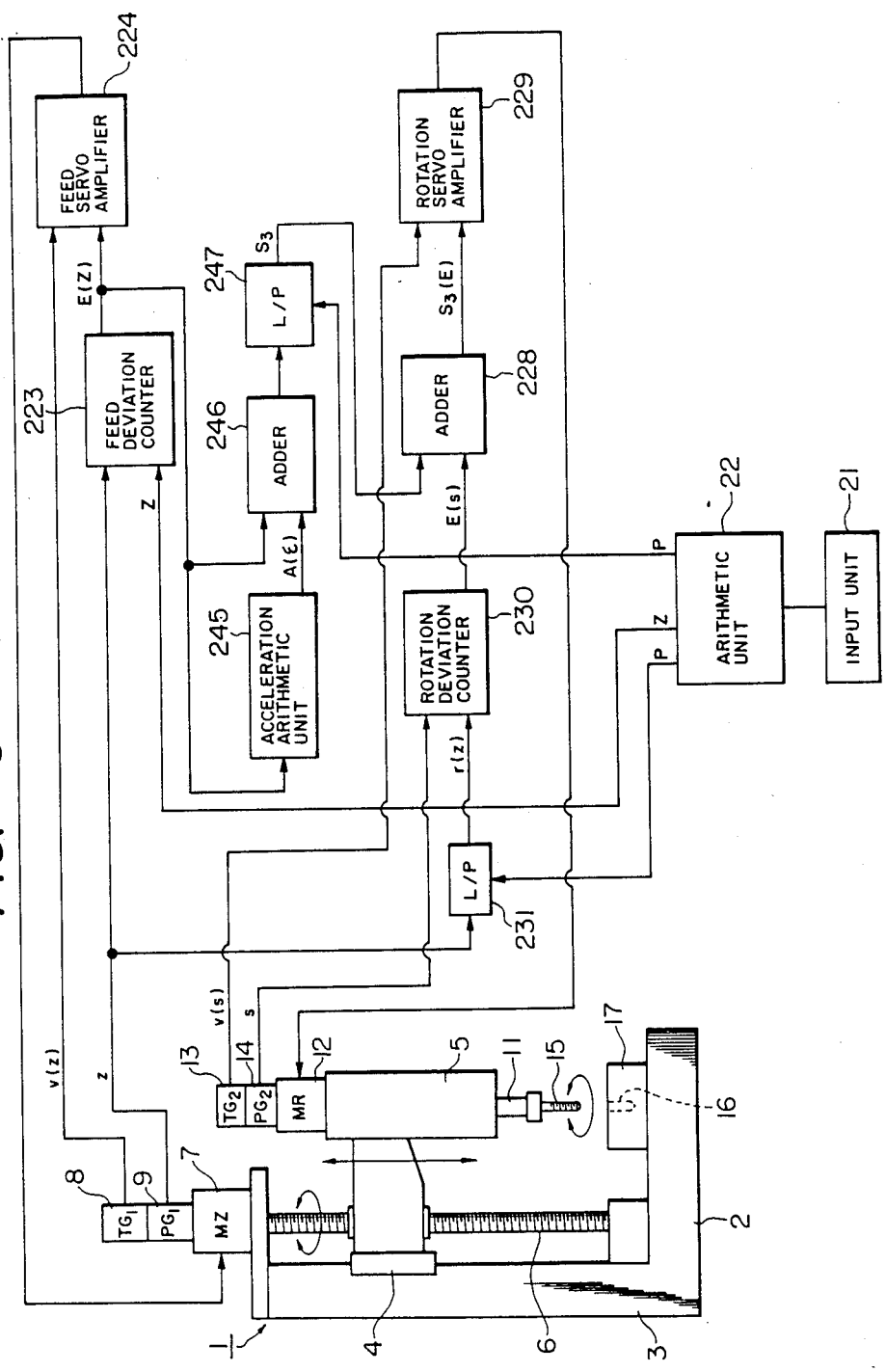
FIG. 5 is a block diagram showing the fifth embodiment of this invention.

The fifth embodiment according to this invention is represented by the block diagram shown in FIG. 5, in which the feed acceleration is provided upon processing and controlling in accordance with the feed deviation E(Z) from the feed deviation counter 223 being the feed instruction to the servo amplifier 224 but not with the feed amount z detected by the pulse generator (PG$_1$) 9.

Referring to FIG. 5, like reference numerals are alloted to elements or units corresponding to those shown in FIG. 3 and the explanation thereof is omitted herein.

The system shown in FIG. 5, unlike the system in FIG. 3, specifically includes the connecting arrangement between an acceleration arithmetic unit 245, an adder 246, and a rotation instruciton arithmetic unit 247 all of which constitute a rotation instruction arithmetic means.

The feed deviation E(Z) from the feed deviation counter 223 is inputted into the acceleration arithmetic unit 245 and the adder 246. The acceleration arithmetic unit 245 serves to compute the acceleration, $A(\epsilon) = dE(Z)/dt$ of the feed deviation E(Z) and then output the thus computed acceleration to the adder 246, and the adder 246 serves to add the acceleration $A(\epsilon)$ to the feed deviation E(Z) and then output the resultant value to the rotation instruction arithmetic unit 247, the output of the adder 246 being expressed by $(E(Z)+dE(Z)/dt)$ as the sum of the speed instruction to the feed servo amplifier 224 and the acceleration thereof. The rotation instruction arithmetic unit 247 serves to multiply the output from the adder 246 by L/P times in accordance with the thread pitch P and the thread lead L for the thread cutting preliminarily inputted from the input unit 21 and then to compute the rotation instruction, $S_3 = L/P(E(Z) + dE(Z)/dt)$.

The computed rotation instruction $S_3$ is then applied to the adder 228 in which the rotation instruction $S_3$ is corrected to an instruction, $S_3(E) = S_3 + E(s)$. According to the corrected rotation instruction $S_3(E)$, the rotation servo amplifier 229 is driven and the motor 12 is controlled as described hereinbefore with respect to the third embodiment.

According to the third to fifth embodiments described above, the rotation instruction is computed by the feed speed and the acceleration, and the motor 12 is synchronously driven by the computed instruction, so that the transient follow-up time lag can be remarkably reduced in comparison with a conventional system in which the motor is synchronously driven only in accordance with the actual feed amount z of the spindle head 5.

For example, an experiment carried out in condition that a thread cutting working (diameter: 6 mm(M6), pitch: 1.0(P1.0) and tap depth: 12 mm) was performed at high speed rotation of the spindle of 3000 r.p.m. showed the fact that the feed error, i.e. pitch error, in the thread feeding direction (Z-axis) on the basis of the rotating position of the thread could be reduced to about 50% in accordance with the third embodiment, in which the feed acceleration is computed on the basis of the feed instruction Z, with respect to the pitch error in the conventional system.

The pitch error could also be reduced to about 55% in accordance with the fourth embodiment, in which the feed acceleration is computed on the basis of the detected actual feed amount z of the spindle head, with respect to the pitch error in the conventional system.

The pitch error could further be reduced to about 12% in accordance with the fifth embodiment, in which the feed acceleration is computed on the basis of the feed deviation E(Z), with respect to the pitch error in the conventional system. With the fifth embodiment, in addition to the reduction of the absolute value of the pitch error, the pitch error can smoothly vary, thus attaining the superior result more than that represented by the actual experimental value to perform highly improved thread cutting working. The reason of such superior result is assumed to be based on the less affect of the external disturbance because the feed amount z of the spindle head is not directly detected but is detected indirectly as the feed deviation E(Z).

The sixth embodiment according to this invention will be explained with reference to the block diagram shown in FIG. 6, and a control circuit for a rotation system (S-axis system) for performing the rotation control of the spindle 11 will be first explained hereunder.

Rotation instruction S is computed in the arithmetic unit 22 on the basis of the data inputted from the input unit 21, and the thus computed rotation instruction S is then applied to a rotation deviation counter 323 as a pulse train in response to the rotation speed. A pulse in response to the rotation angle of the motor 12 is inputted as a position feedback pulse into the rotation deviation counter 323 from the pulse generator $(PG_2)$ 14, and the rotation deviation counter 323 then serves to compute the deviation, $E(s) = S - s$ between the rotation instruction S and the rotating position of the spindle 11 detected by the pulse generator $(PG_2)$ 14 and to output the thus computed rotation deviation E(s) to a rotation servo amplifier 324 as the speed instruction. To the rotation servo amplifier 324 is inputted from the tachometer generator $(TG_2)$ 13 a signal v(s) in accordance with the actual speed as a speed feedback signal, thus constituting a speed loop circuit thereby driving the motor 12. The control circuit of the described rotation system (S-axis system) is substantially the same as a circuit arrangement used for an ordinary feed control.

A control circuit for a feed system (Z-axis system) for moving vertically the spindle head 5 will be explained hereunder in accordance with the sixth embodiment of this invention. In this feed system, the data supplied from an input unit 21 is subjected to arithmetic processing in an arithmetic unit 22 to provide the rotation instruction S.

The rotation instruction S from the arithmetic unit 22 is inputted to an acceleration arithmetic unit 325 in which the acceleration, $A(s) = d\Delta S/dt$, is computed on the basis of the rotation instruction amount $\Delta s$ per unit time, and the computed acceleration A(s) is then applied to an adder 326, to which a feed feedback pulse in inputted independently. The adder 326 serves to add the actual rotation amount s per unit time to the acceleration A(s) of the rotation instruction S, and then to output the result of this addition to a feed instruction arithmetic unit 327. The rotation amount $\Delta s$ per unit time corresponds to the actual rotating speed v(s), so that the output from the adder 326 is the sum of the change in the rotating speed and the acceleration, i.e. $(\Delta s + d\Delta S/dt)$.

The feed instruction operating unit 327 serves to compute the feed instruction, $Z_1 = P/L \cdot (\Delta s + d\Delta S/dt)$, by multiplying the output from the adder 326 by L/P times, in accordance with the thread pitch P and the thread lead L of the threaded shaft 6 for the thread cutting working preliminarily inputted from the input unit 21 through the arithmetic unit 22. The acceleration arithmetic unit 325, the added 326, and the feed instruction arithmetic unit 327 constitute a feed instruciton arithmetic means.

The feed instruction Z outputted from the feed instruction arithmetic unit 327 is a value corresponding to the sum of the addition of the rotating speed and the acceleration, and accordingly, the value is the feed instruction including a forecasted rotation of the spindle 11. The feed instruction Z is then applied from the feed instruction arithmetic unit 327 into a feed servo amplifier 329 through an adder 328, in which the correction of the feed instruction $Z_1$ is performed in the following manner.

A pulse from the pulse generator $(PG_1)$ 9 detecting the feed amount of the spindle head 5 is inputted to the feed deviation counter 330, and a pulse from the pulse generator (PG$_2$) 14 detecting the rotating positions of the spindle 11 is inputted to a feed correction arithmetic unit 331, in which the rotating amount s is multiplied by P/L times in accordance with the thread pitch P and the thread lead L for the thread cutting working to compute the feed correction amount, $r(s)=P/L \cdot s$, corresponding to the rotating amounts. The thus computed feed correction amount r(s) is then applied to the feed deviation counter 330, which then serves to compute the feed deviation E(z) between the feed correction value r(s) and the feed amount z of the spindle head 5 and to output the obtained feed deviation E(z) to the adder 328. The adder 328 serves to correct the feed instruction $Z_1$ from the feed instruction arithmetic unit 327 in accordance with the feed deviation E(z), and the corrected feed instruction, $R(Z_1)=Z_1+E(z)$ which is then applied to the feed servo amplifier 329.

To the feed servo amplifier 329 is inputted a signal V(z), as a speed feedback signal, in response to the speed from the tachometer generator (TG$_1$) 8, thus constituting a speed loop circuit thereby driving the feed motor 7 in accordance with the corrected feed instruction R(Z).

The control circuit means in the described sixth embodiment of this invention implements the digital arithmetic operations, and the arithmetic unit 22, the deviation counters 323 and 330, the acceleration arithmetic unit 325, the adder 326, the feed instruction arithmetic unit 327, the feed correction arithmetic unit 331, and the adder 328 are all realized with microcomputers for carrying out the internal operation processings.

The motor 12 is driven in response to the data indicative of the thread pitch P, the feed stroke (i.e. tap depth), and the rotating speed inputted from the input unit 21, and the feed motor 7 is then driven in the manner following to and synchronous with the motor 12, thus performing the thread cutting operation.

With the sixth embodiment described above, the feed instruction is computed in accordance with the rotation acceleration A(S) based on the rotation instruction S, but in a modification, the rotation acceleration may be computed fromthe other value.

Figure 7:
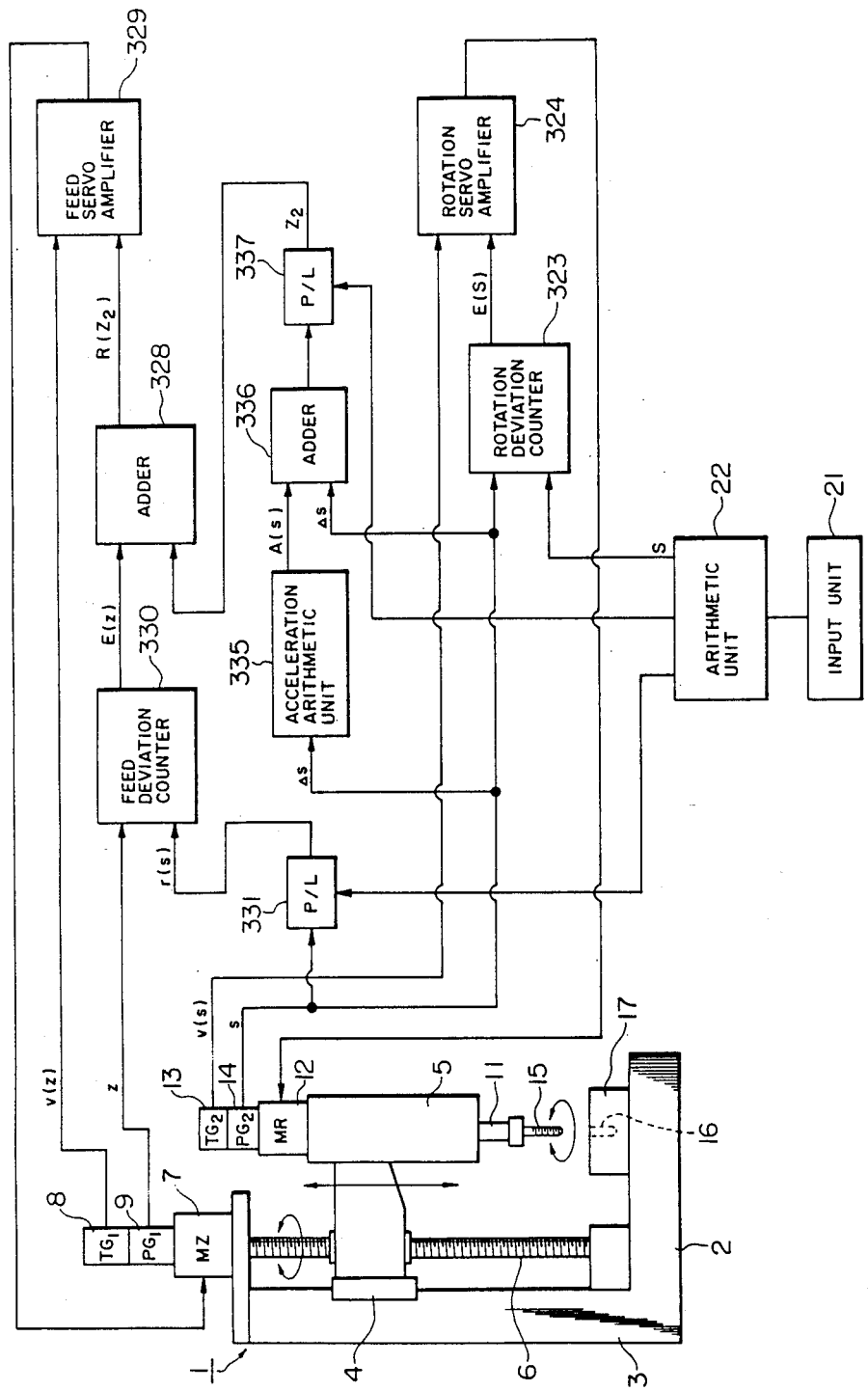
FIG. 7 is a block diagram showing the seventh embodiment of this invention.

The seventh embodiment is represented by the block diagram shown in FIG. 7, in which the rotation acceleration is not computed in accordance with the rotation instruction but is computed in accordance with the actual rotating amount s of the spindle 11 detected by the pulse generator (PG$_2$) 14.

Figure 6:
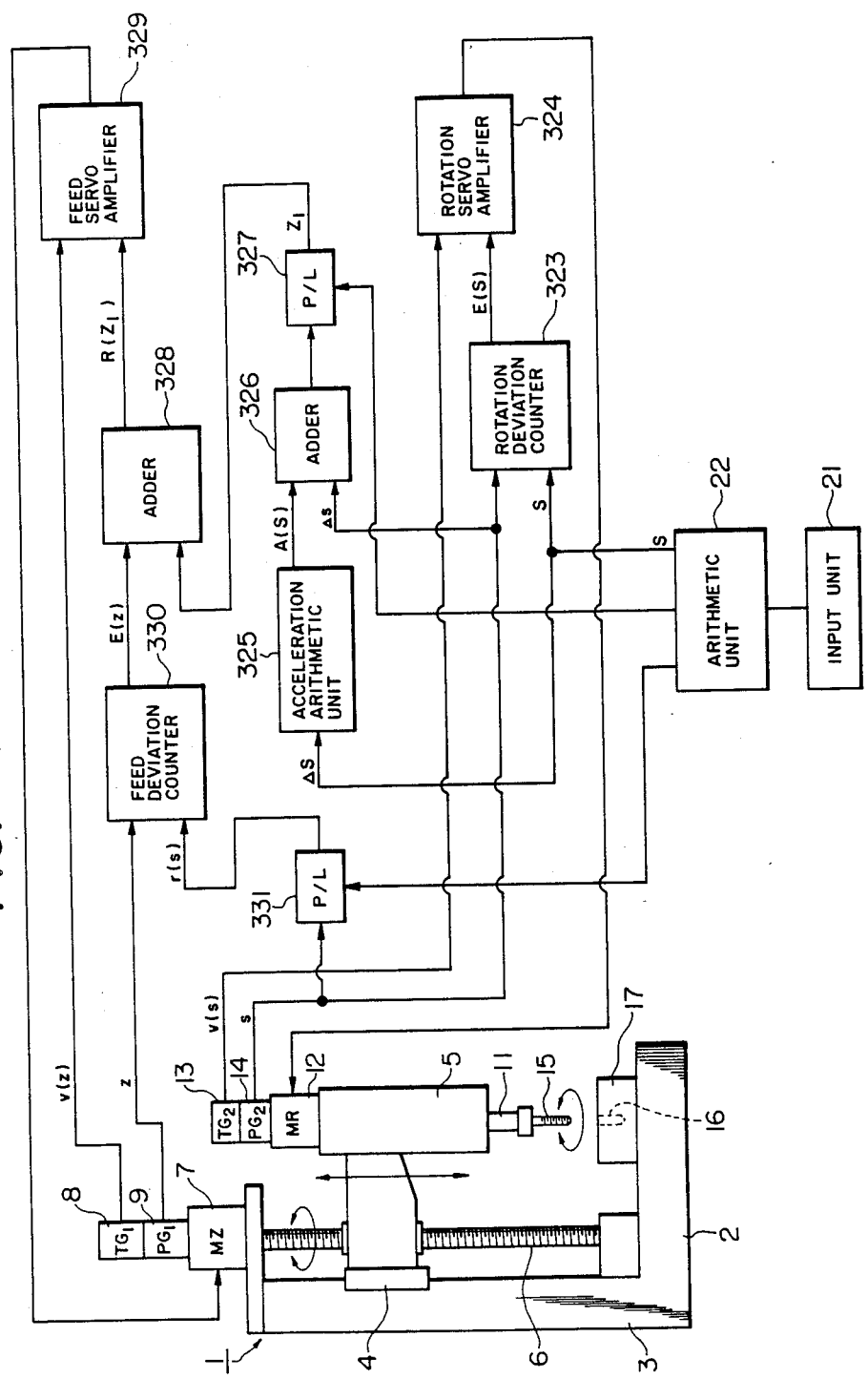
FIG. 6 is a block diagram showing the sixth embodiment of this invention.

Referring to FIG. 7, like reference numerals are alloted to elements or units corresponding to those shown in FIG. 6 and the explanation thereof is omitted herein. The system shown in FIG. 7, unlike the system shown in FIG. 6, specifically includes the connection arrangement between the acceleration arithmetic unit 335, the adder 336 and the feed instruction arithmetic unit 337 all of which constitute a feed instruction arithmetic means.

The rotation feedback pulse from the pulse generator (PG$_2$) 14 is inputted to the acceleration arithmetic unit 335 and the adder 336. The acceleration arithmetic unit 335 serves to compute the rotation acceleration, $A(s)=d\Delta s/dt$, from the actual rotation amount $\Delta$ s per unit time and the thus computed acceleration A(s) is applied to the adder 336. The adder 336 serves to add the acceleration A(s) to the rotation amount $\Delta$ s per unit time from the pulse generator (PG$_2$) 14 and the resultant value is outputted therefrom to the feed instruciton arithmetic unit 337. The output from the adder 336 is the sum of the addition of the rotation speed and the acceleration which is expressed as $(\Delta s + d\Delta s/dt)$. The feed instruction arithmetic unit 337 serves to multiply the output from the adder 336 by L/P times in accordance with the thread pitch P and the thread lead L for the thread cutting working which are preliminarily inputted from the input unit 21 to compute the feed instruction, $Z_2 = P/L \cdot (\Delta s + d\Delta s/dt)$, which is then applied to the adder 328.

The feed instruction $z_2$ is corrected in the adder 328 to obtain the corrected feed instruction, $R(z_2)=Z_2+e(z)$, and the feed servo amplifier 329 is driven in accordance with the corrected feed instruction $R(z_2)$. The feed motor 7 is then controlled as described with respect to the foregoing sixth embodiment.

Figure 8:
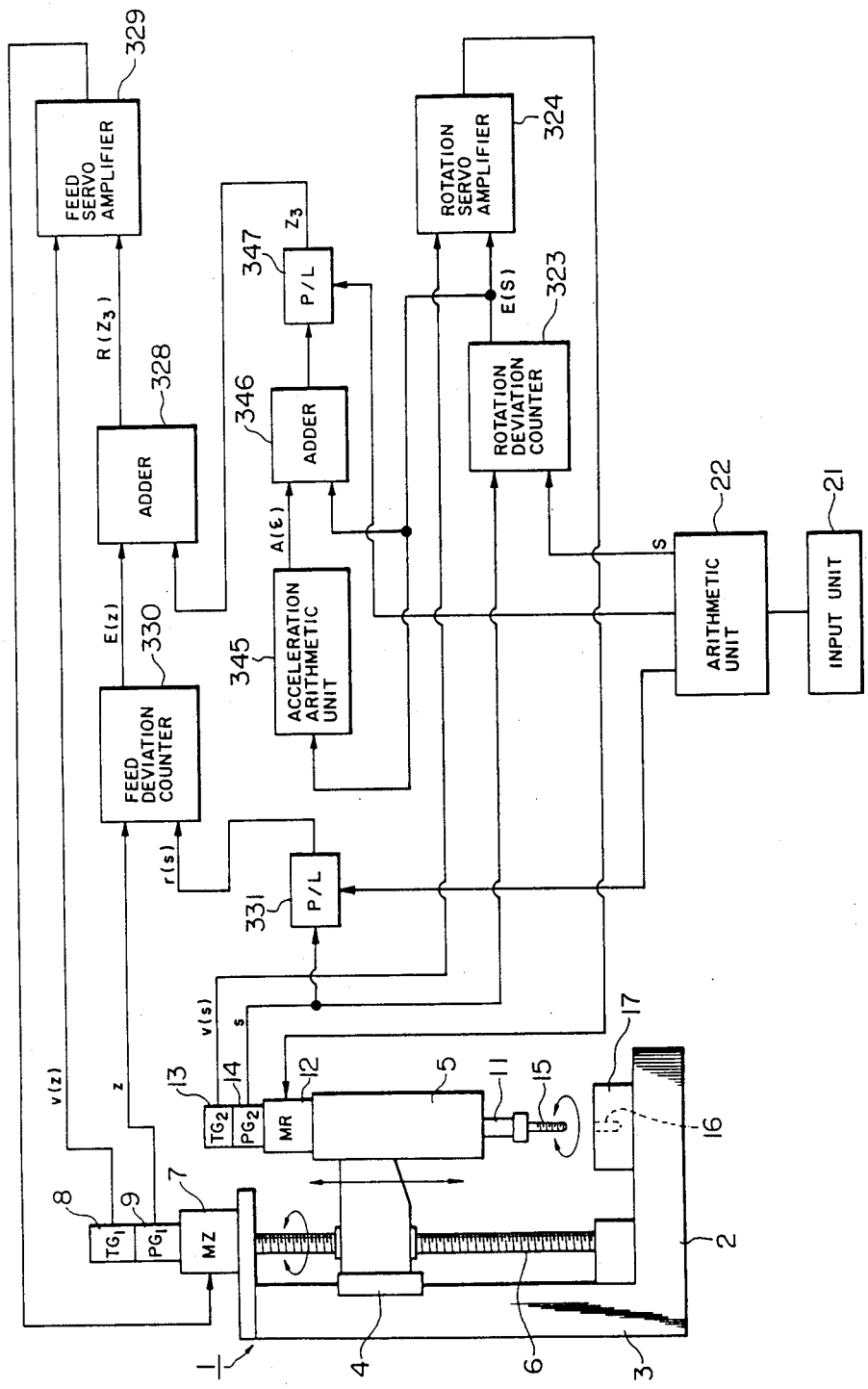
FIG. 8 is a block diagram showing the eighth embodiment of this invention.

The eighth embodiment according to this invention is represented by the block diagram shown in FIG. 8.

According to this invention, the acceleration of the rotation is computed on the basis of the rotation deviation E(S) from the rotation deviation counter 323 which is the speed instruction to the rotation servo amplifier 324, but is not computed on the basis of the rotation amount s itself detected by the pulse generator (PG$_2$) 14.

Referring to FIG. 8, like reference numerals are alloted to elements or units corresponding to those shown in FIG. 6 and the explanation thereof is omitted herein. The system shown in FIG. 8, unlike the system shown in FIG. 6, specifically includes the connection arrangement between an acceleration arithmetic unit 345, an adder 346, and a feed instruction arithmetic unit 347 all of which constitute a feed instruction operating means.

The feed deviation E(S) is inputted to the acceleration arithmetic unit 345 and the adder 346 from the rotation deviation counter 324. The acceleration arithmetic unit 345 computes the acceleration, $A(\epsilon)=dE(S)/dt$, of the rotation deviation E(S), and the thus computed acceleration $A(\epsilon)$ is applied to the adder 346, in which the acceleration $A(\epsilon)$ is added to the rotation deviation E(S) and the resultant value is applied therefrom to the feed instruction arithmetic unit 347. The output to the adder 346 is the sum of the addition of the speed instruction to the rotation servo amplifier and the acceleration thereof, i.e. $(E(S)+dE(s)/dt)$. The feed instruction arithmetic unit 347 serves to multiply the output from the added 346 by L/p times in accordance with the thread pitch P and the thread lead L for the thread cutting working which are preliminarily inputted from the input unit 32 and then to compute the feed instruction, $Z_3=P/L \cdot [E(S)+dE(S)/dt]$, which is then applied to the adder 328.

The feed instruction $Z_3$ is corrected in the adder 328 to obtain the correct instruction, $R(Z_3)=Z_3+E(z)$. The feed servo motor 329 is driven in accordance with the corrected feed instruction $Z_3$ and the feed motor 7 is then controlled as described with respect to the aforementioned sixth embodiment.

According to the sixth to the eighth embodiments of this invention, the rotation speed and the acceleration are computed and the feed instruction is then computed from the thus resultant value to drive the feed motor 7 in the synchronous manner, thus reducing remarkably the transient follow-up time lag in comparison with the conventional system in which the synchronous driving of the motor is performed in accordance with only the actual rotation amount s of the spindle 11.

For example, an experiment carried out in condition that a thread cutting working (diameter: 6 mm (M6), pitch: 1.0 (P1.0) and tap depth: 12 mm) was performed at high speed rotation of the spindle of 3000 r.p.m. showed the fact that the feed error, i.e. pitch error, in the thread feeding direction (Z-axis) on the basis of the rotating position of the thread could be reduced to about 55% in accordance with the sixth embodiment in which the rotation acceleration is computed on the basis of the rotation instruction S with respect to the pitch error in the conventional system.

The pitch error could also be reduced to about 58% in accordance with the seventh embodiment, in which the rotation acceleration is operated on the basis of the detected actual rotation amount s of the spindle, with respect to the pitch error in the conventional system.

The pitch error could further be reduced to about 20% in accordance with the eighth embodiment, in which the rotation acceleration is operated on the basis of the rotation deviation E(S), with respect to the pitch error in the conventional system.

With the eighth embodiment, in addition to the remarkable reduction of the absolute value of the pitch error, the pitch error can smoothly vary, thus attaining the superior result more than that represented by the actual experimental value to perform the highly improved thread cutting working. The reason of such superior result is assumed to be based on the reduced affect of the external disturbance because the rotation amount s of the spindle 11 is not directly detected but is detected indirectly as the deviation E(S).

Consequently, according to the preferred embodiments of this inventin, the follow-up characteristics or performances of the spindle and the feed shaft can be remarkably improved and the thread cutting can be performed with high accuracy and reliability.

We claim:

1. In a thread cutting machine including a spindle for holding a thread cutting tool, a spindle head for supporting said spindle, a spindle motor for rotating said spindle, a feed motor for driving said spindle head, a detector for detecting a rotating position of said spindle, and a detector for detecting a feed position and a feed amount of said spindle head, and wherein said thread cutting is conducted under synchronous driving operation of said spindle motor and said feed motor, said thread cutting machine comprising:
   means for computing a feed deviation between a feed instruction and a feed position of said spindle head detected by the feed position detector;
   means operatively connected to said feed deviation computing means for driving the feed motor in accordance with the feed deviation;
   means operatively connected to said feed deviation computing means for computing a rotation instruction corresponding to the feed deviation on the basis of a thread pitch;
   means operatively connected to said feed position detector for computing a rotation correction value corresponding to the detected feed amount of the spindle head on the basis of the thread pitch;
   means operatively connected to said rotation correction value computing means and said spindle rotating position detector for computing a rotation deviation between said rotation correction value and the rotation position of said spindle;
   means operatively connected to said rotation deviation computing means for correcting the rotation instruction on the basis of said rotation deviation and
   means operatively connected to said correcting means for driving said spindle motor in accordance with the corrected rotation instruction.

2. In a thread cutting machine including a spindle for holding a thread cutting tool, a spindle head for supporting said spindle, a spindle motor for rotating said spindle, a feed motor for driving said spindle head, a detector for detecting a rotating position of said spindle, a detector for detecting a feed position and a feed amount of said spindle head, and wherein said thread cutting is conducted under synchronous driving operation of said spindle motor and said feed motor, said thread cutting machine comprising:
   means for computing a rotation deviation between a rotation instruction and a rotating position of said spindle detected by the rotating position detector;
   means operatively connected to said rotation deviation computing means for driving said spindle motor for rotating said spindle in accordance with the rotation deviation;
   means operatively connected to said rotation deviation computing means for computing a feed instruction corresponding to the said rotation deviation on the basis of a thread pitch;
   means operatively connected to said rotation position detector for computing a feed correction value corresponding to the detected rotating position of the spindle on the basis of the thread pitch;
   means operatively connected to said feed correction value computing means and said feed position detector for computing a feed deviation between the feed correction value and the feed amount of said spindle head;
   means operatively connected to said feed deviation computing means for correcting the feed instruction on the basis of said feed deviation; and
   means operatively connected to said correcting means for driving the feed motor in accordance with the corrected feed instruction.

3. In a thread cutting machine including a spindle for holding a thread cutting tool, a spindle head for supporting said spindle, a spindle motor for rotating said spindle, a feed motor for driving said spindle head, a detector for detecting a rotating position of said spindle, a detector for detecting a feed position and a feed amount of said spindle head, and wherein thread cutting is conducted under synchronous driving operation of said spindle motor and said feed motor, said thread cutting machine comprising:
   means for computing a feed deviation between a feed instruction and a feed position of said spindle head detected by the feed position detector;
   means operatively connected to said feed deviation computing means for driving the feed motor in accordance with the feed deviation;
   means for computing feed speed and acceleration;
   means for computing a rotation instruction corresponding to the computed feed speed and acceleration on the basis of a thread pitch;
   means operatively connected to said feed position detector for computing a rotation correction value corresponding to the detected feed amount of said spindle head on the basis of the thread pitch;
   means operatively connected to said rotation correction computing means and said spindle position detector for computing a rotation deviation between the rotation correction value and the rotating position of said spindle;

means operatively connected to said rotation deviation computing means for correcting the rotation instruction on the basis of said rotation deviation; and, means operatively connected to said correcting means for driving said spindle motor for rotating said spindle in accordance with the corrected rotation instruction.

4. The thread cutting machine according to claim 3 wherein said rotation instruction computing means serves to compute a feed acceleration in accordance with a feed instruction.

5. The thread cutting machine according to claim 3 wherein said rotation instruction computing means serves to compute a feed acceleration in accordance with the detected feed amount of said spindle head.

6. The thread cutting machine according to claim 3 wherein said rotation instruction computing means serves to compute a feed acceleration in accordance with the feed deviation.

7. In a thread cutting machine including a spindle for holding a thread cutting tool, a spindle head for supporting said spindle, a spindle motor for rotating said spindle, a feed motor for driving said spindle head, a detector for detecting a rotating position of said spindle, a detector for detecting a feed position and a feed amount of said spindle head, and wherein thread cutting working is conducted under synchronous driving operation of said spindle motor and said feed motor, said thread cutting machine comprising:

means for computing a rotation deviation between a rotation instruction and a rotating position of said spindle detected by the rotating position detector;

means operatively connected to said rotation deviation computing means for driving said spindle motor in accordance with the rotation deviation;

means for computing a rotation speed and an acceleration;

means for computing a feed instruction corresponding to the computed feed speed and acceleration on the basis of a thread pitch;

means operatively connected to said feed instruction computing means for computing a feed correction value corresponding to the detected rotating position of said spindle on the basis of the thread pitch;

means operatively connected to said feed correction computing means and said feed position detector for computing a feed deviation between the feed correction value and the detected feed amount of the spindle head;

means operatively connected to said feed deviation computing means for correcting the feed instruction on the basis of said feed deviation; and means operatively connected to said correcting means for driving the feed motor in accordance with said corrected feed instruction.

8. The thread cutting machine according to claim 7, wherein said feed instruction computing means serves to compute a rotation acceleration in accordance with the rotation instruction.

9. The thread cutting machine according to claim 7 wherein said feed instruction computing means serves to compute a rotation acceleration in accordance with the rotating position of said spindle.

10. The thread cutting machine according to claim 7, wherein said feed instruction computing means serves to compute a rotation acceleration in accordance with the rotation deviation.

* * * * *